US00RE47670E

(19) United States
(12) Reissued Patent
Yamamoto et al.

(10) Patent Number: US RE47,670 E
(45) Date of Reissued Patent: Oct. 29, 2019

(54) RECORDING APPARATUS

(71) Applicant: Brother Kogyo Kabushiki Kaisha, Nagoya-shi, Aichi-ken (JP)

(72) Inventors: Shinya Yamamoto, Nagoya (JP); Tomoyasu Yabuki, Nagoya (JP)

(73) Assignee: Brother Kogyo Kabushiki Kaisha, Nagoya-shi, Aichi-ken (JP)

(21) Appl. No.: 15/487,744

(22) Filed: Apr. 14, 2017

Related U.S. Patent Documents

Reissue of:
(64) Patent No.: 9,004,676
Issued: Apr. 14, 2015
Appl. No.: 13/434,203
Filed: Mar. 29, 2012

(30) Foreign Application Priority Data

Mar. 31, 2011 (JP) ..... 2011-079592

(51) Int. Cl.
*B41J 29/13* (2006.01)

(52) U.S. Cl.
CPC ..... *B41J 29/13* (2013.01)

(58) Field of Classification Search
CPC . B41J 29/13; B41J 29/02; B41J 2/1752; B41J 2/17513; B41J 29/38
USPC ..... 347/108, 86, 109
See application file for complete search history.

(56) References Cited

U.S. PATENT DOCUMENTS 4,947,208 A * 8/1990 Komatsu ..... G03G 21/1842 399/111
5,083,158 A * 1/1992 Kashima ..... G03G 21/1832 399/114
5,157,416 A 10/1992 Kinoshita et al. ..... B41J 29/12 347/263
6,419,411 B1 7/2002 Tanno
2004/0051764 A1* 3/2004 Cook et al. ..... 347/86
2004/0125182 A1 7/2004 Akermalm
2005/0062793 A1 3/2005 Takagi et al.
(Continued)

FOREIGN PATENT DOCUMENTS

EP 0598701 A2 5/1994
EP 2163390 A1 3/2010
(Continued)

OTHER PUBLICATIONS

European Patent Office, extended European Search Report for European Patent Application No. 111870317 (counterpart to co-pending U.S. Appl. No. 13/284,664), dated Feb. 7, 2012.
(Continued)

*Primary Examiner* — Minh Nguyen
(74) *Attorney, Agent, or Firm* — Baker Botts L.L.P.

(57) ABSTRACT

A recording apparatus includes: a first housing; a second housing pivotable about a shaft relative to the first housing between a close position and a distant position; and a tank mount portion provided in the second housing such that a mounting direction of a tank with respect to the tank mount portion in a state in which the second housing is at the distant position has a downward component in a vertical direction. The tank mount portion includes a resistance applying mechanism which applies a resistance force to the tank in a state in which at least a part of the tank is inserted into the tank mount portion when the second housing is at the distant position.

11 Claims, 4 Drawing Sheets

(56) References Cited

U.S. PATENT DOCUMENTS

| | | | | |
|---|---|---|---|---|
| 2005/0151822 | A1 | 7/2005 | Kamimura | |
| 2006/0029418 | A1 | 2/2006 | Ishii et al. | |
| 2007/0149044 | A1 | 6/2007 | Asauchi | |
| 2007/0229620 | A1* | 10/2007 | Yano | 347/86 |
| 2008/0002003 | A1* | 1/2008 | Kobayashi | 347/86 |
| 2008/0123126 | A1 | 5/2008 | Harris | |
| 2008/0231662 | A1 | 9/2008 | Brown et al. | |
| 2008/0316283 | A1 | 12/2008 | Osawa et al. | |
| 2009/0002431 | A1 | 1/2009 | Osawa et al. | |
| 2010/0225704 | A1* | 9/2010 | Aoki et al. | 347/50 |
| 2012/0249629 | A1 | 10/2012 | Yabuki | |

FOREIGN PATENT DOCUMENTS

| | | | | | |
|---|---|---|---|---|---|
| JP | S58-116182 | A | | 7/1983 | |
| JP | S60-172575 | A | | 9/1985 | |
| JP | S63-254044 | A | | 10/1988 | |
| JP | H04-083277 | A | | 3/1992 | |
| JP | H05-131720 | A | | 5/1993 | |
| JP | 1994-051582 | | * | 2/1994 | B41J 29/00 |
| JP | 1994-051582 | A | | 2/1994 | |
| JP | H06-051582 | A | | 2/1994 | |
| JP | H08-002754 | A | | 1/1996 | |
| JP | H09-258576 | A | | 10/1997 | |
| JP | 2000-095374 | A | | 4/2000 | |
| JP | 2002-001987 | A | | 1/2002 | |
| JP | 2004-345307 | A | | 12/2004 | |
| JP | 2005-088209 | A | | 4/2005 | |
| JP | 2005-096187 | A | | 4/2005 | |
| JP | 2006-044128 | A | | 2/2006 | |
| JP | 2006-142608 | A | | 6/2006 | |
| JP | 2008-188948 | A | | 8/2008 | |
| JP | 2009-001011 | A | | 1/2009 | |
| JP | 2009-072931 | A | | 4/2009 | |
| JP | 2010-260356 | A | | 11/2010 | |
| WO | 01/89836 | A1 | | 11/2001 | |

OTHER PUBLICATIONS

Japan Patent Office, Notification of Reason for Refusal for Japanese Patent Application No. 2011-079592 (counterpart Japanese patent application), dated Apr. 16, 2013.

European Patent Office, extended European Search Report for European Patent Application No. 121614846 (counterpart European patent application), dated Jan. 30, 2013.

* cited by examiner

RECORDING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

The present application *is a reissue application of U.S. Pat. No. 9,004,676 B2, which issued from U.S. patent application Ser. No. 13/434,203 filed on Mar. 29, 2012 and which* claims priority from Japanese Patent Application No. 2011-079592, which was filed on Mar. 31, 2011, the [disclosure] *disclosures* of which [is] *are* herein incorporated by reference in [its] *their* entirety.

BACKGROUND OF THE INVENTION

1. Field of the Invention

The present invention relates to a recording apparatus which records an image on a recording medium.

2. Discussion of Related Art

There is known a recording apparatus that includes a tank mount portion in which a tank, which stores a recording agent for an image recording on a recording medium, is mounted. The recording apparatus includes a first housing and a second housing. The first housing is located below the second housing and has the tank mount portion. The second housing is pivotable upward relative to the first housing between a close position at which the second housing is adjacent to the first housing and a distant position at which the second housing is distant farther from the first housing than the second housing at the close position.

SUMMARY OF THE INVENTION

In the above-described recording apparatus, however, the inventors of the present invention found that the following problem occurred in a case where the tank mount portion is disposed in the second housing. The problem occurs in a case where, when the second housing is pivoted for another purpose (such as a maintenance work) beside attaching and detaching of the tank, the tank is in the process of being mounted in the tank mount portion, i.e., the tank is located in the tank mount portion, but is not thoroughly mounted (fixed) therein. In this case, as the second housing is pivoted, the tank is moved inside the tank mount portion simultaneously with the rotation of the second housing. As a result, it is possible that the tank collides with the tank mount portion, and that the tank and the tank mount portion are damaged. Further, even in a case where the tank is mounted in the tank mount portion by a user in a state in which the second housing is positioned at the distant position, it is also predicted that the tank and the tank mount portion are damaged.

It is therefore an object of the present invention to provide a recording apparatus to restrain an impact between the tank and the tank mount portion.

In order to achieve the above-mentioned object, according to the present invention, there is provided a recording apparatus comprising: a first housing; a second housing configured to be connected to the first housing via a shaft and pivotable about the shaft relative to the first housing between a close position at which an image is recorded on a recording medium and a distant position at which the second housing is distant farther from the first housing than at the close position; and a tank mount portion provided in the second housing such that a mounting direction of a tank with respect to the tank mount portion in a state in which the second housing is at the distant position has a downward component in a vertical direction, the tank storing a recording agent for an image recording on the recording medium. The tank mount portion includes a resistance applying mechanism configured to apply a resistance force, when the second housing is at the distant position, to the tank in a state in which at least a part of the tank is inserted into the tank mount portion. The resistance force is different from a kinetic friction force which is applied from an inner surface of the tank mount portion to the tank and which acts in a direction opposite to the mounting direction.

BRIEF DESCRIPTION OF THE DRAWINGS

The above and optional objects, features, and advantages of the present invention will be better understood by reading the following detailed description of the embodiments of the invention when considered in conjunction with the accompanying drawings, in which:

FIG. 3A is a front view of the cartridge mount portion, FIG. 3B is a cross-sectional view taken along a line in FIG. 3A, and FIG. 3C is a cross-sectional view of an upper housing at a distant position; FIG. 4A is a front view of a cartridge mount portion and FIG. 4B is a cross-sectional view taken along a line IV-IV in FIG. 4A.

DETAILED DESCRIPTION OF THE EMBODIMENTS

Figure 1:
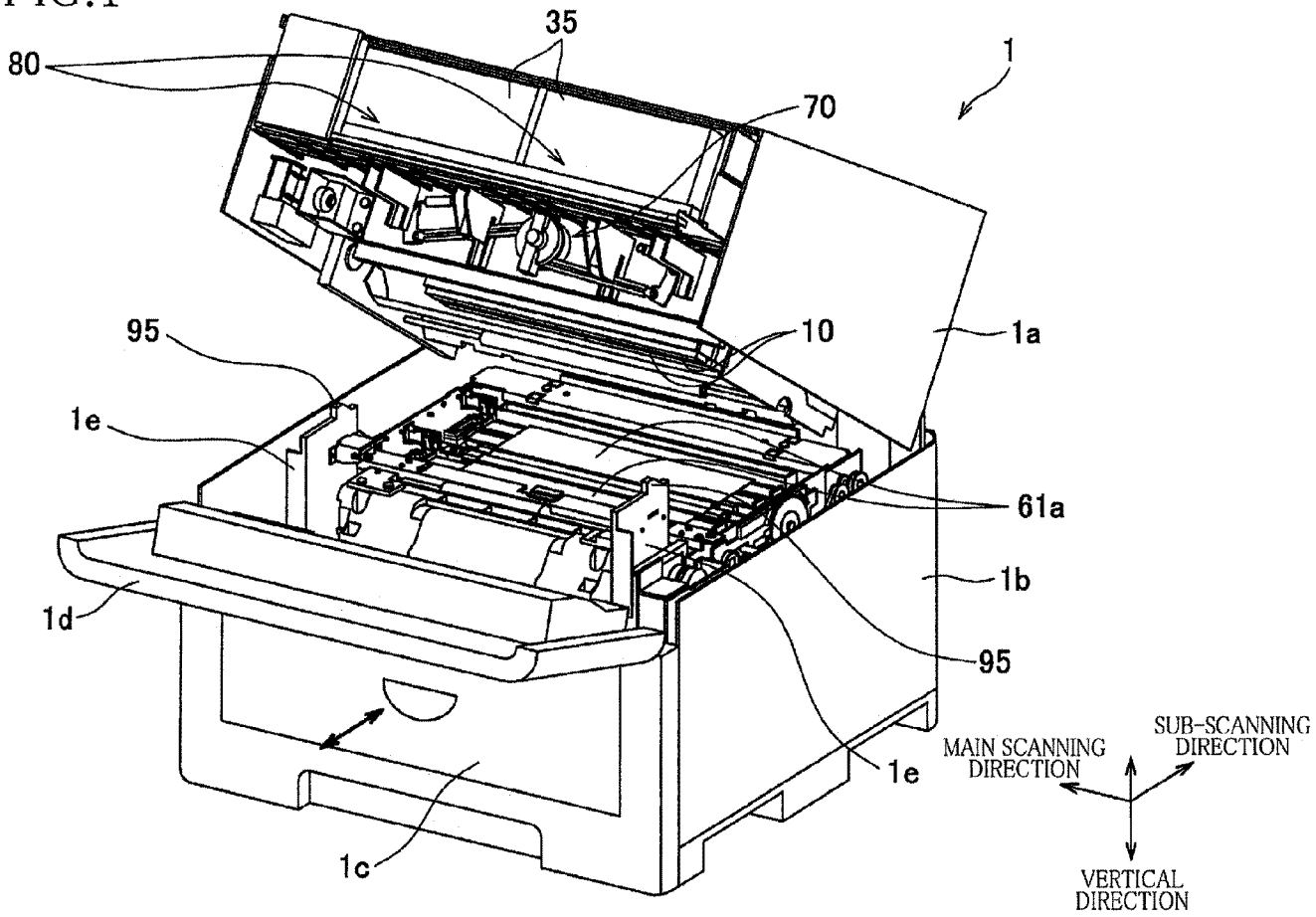
FIG. 1 is a perspective view showing an appearance of an inkjet printer as an embodiment of a recording apparatus to which the present invention is applied.

Hereinafter, there will be described embodiments of the present invention with reference to the drawings.

There will be described an overall configuration of an inkjet printer 1 as an embodiment of a recording apparatus to which the present invention is applied with reference to FIG. 1 and FIG. 2.

The inkjet printer 1 includes an upper housing 1a (as an example of a second housing) and a lower housing 1b (as an example of a first housing) each of which has a rectangular parallelepiped shape and which have substantially the same size. The upper housing 1a has an opening on a lower surface thereof and the lower housing 1b has an opening on an upper surface thereof. In a state in which the upper housing 1a is superposed on the lower housing 1b such that the lower surface of the upper housing 1a and the upper surface of the lower housing 1b are sealed with each other, an internal space of the inkjet printer 1 is defined as shown in FIG. 2. In an upper portion of a top panel of the upper housing 1a, a sheet-discharge portion 31 is disposed. In the space defined by the upper housing 1a and the lower housing 1b, there is formed a sheet feed path through which a recording sheet P is fed from a sheet-feed unit 1c (described later) to the sheet-discharge portion 31 along a thick arrow shown in FIG. 2.

Figure 2:
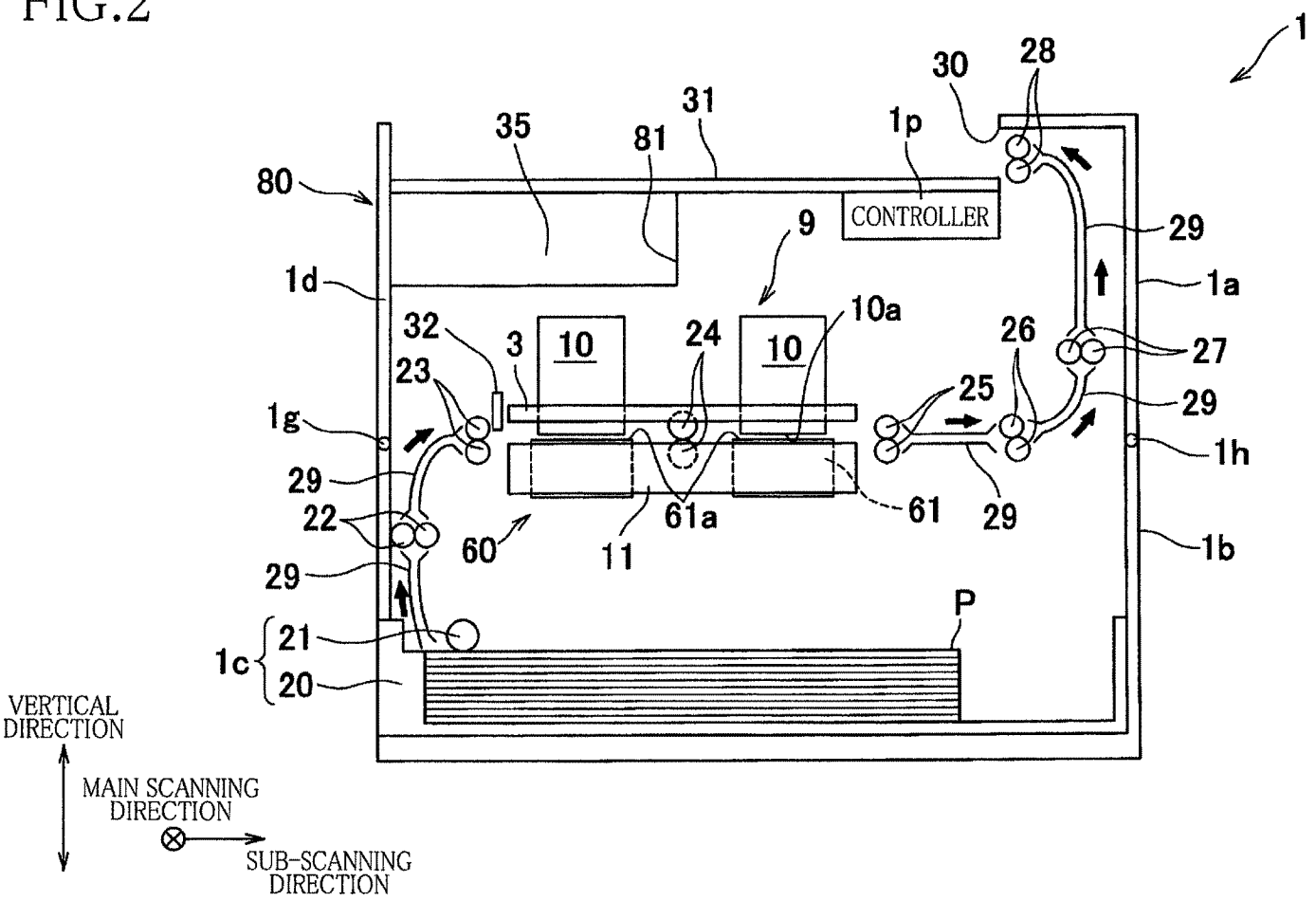
FIG. 2 is a side view schematically showing an internal construction of the inkjet printer.

As shown in FIG. 2, the upper housing 1a is connected to the lower housing 1b via a shaft 1h which is disposed at a side of a bottom end of the upper housing 1a and extends in a main scanning direction. The upper housing 1a is pivotable about the shaft 1h relative to the lower housing 1b. The upper housing 1a is pivotable between a close position, a position shown in FIG. 2, at which the upper housing 1a is adjacent to the lower housing 1b and a distant position, a position shown in FIG. 1, at which the upper housing 1a is positioned farther away from the lower housing 1b than at the close position. In a state in which the upper housing 1a is at the distant position, a part of the sheet feed path that is formed by the upper housing 1a at the close position and the lower housing 1b is exposed to the outside, so that a workspace is provided for a user in the sheet feed path. Since the workspace is secured by the upper housing 1a at the distant position, the user can perform a jam treatment and maintenance works in a recording portion 9 and a supporting portion 60. The jam treatment is a work in which the user removes a jammed recording sheet P in the sheet feed path during a recording operation. The maintenance works in the recording portion 9 includes a work in which the user removes a foreign matter adhered to an ejection surface 10a, a work in which the user adjusts a position in which a head 10 is disposed, a work in which the user replaces the head 10 with another, and so on. Further, the maintenance works in the supporting portion 60 includes a work in which the user removes a foreign matter adhered to a supporting surface 61a, a work in which the user adjusts a position in which the supporting portion 60 is disposed, a work in which the user replaces the supporting portion 60 with another, and so on. Furthermore, the maintenance works includes a cleaning work and a replacement work of composing elements that are accommodated in the upper housing 1a and the lower housing 1b such as a sheet-supply roller 21, guides 20, and pairs of feed rollers 22 through 28. In the shaft 1h, there is disposed a spring (not shown) which applies a force to the upper housing 1a in a direction in which the upper housing 1a is opened or moved from the close position to the distant position. In the present embodiment, the upper housing 1a can be opened up to an inclined angle of about 35 degrees with respect to a horizontal surface. The distant position of the upper housing 1a is not limited to the position shown in FIG. 1. The distant position can be a position that is different from the close position and at which the upper housing 1a is distant farther from the lower housing 1b than the upper housing 1a at the close position.

In a front side of the upper housing 1a or a surface on a left side of a sheet plane of FIG. 1, there is disposed a lock mechanism 70 which limits a pivot of the upper housing 1a at the close position. In a front side of the lower housing 1b, there is disposed a cover 1d which covers the front side of the upper housing 1a and can be opened and closed. The cover 1d is pivotable about a shaft 1g that is disposed in a lower end of the cover 1d such that the front side of the upper housing 1a is opened and closed. When the cover 1d is opened, the lock mechanism 70 and two cartridges 35 are exposed to the outside. In a case where the upper housing 1a is pivoted from the close position to the distant position, the user first opens the cover 1d and releases a limitation by the lock mechanism 70. The upper housing 1a is then pivoted from the close position to the distant position. On the other hand, in a case where the upper housing 1a is returned from the distant position to the close position, after the upper housing 1a is returned from the distant position to the close position by the user, the pivot of the upper housing 1a is limited by the lock mechanism 70, and then the cover 1d is closed.

In the upper housing 1a, there are accommodated two heads 10 (a pre-coat head 10 which ejects a pretreatment liquid and an inkjet head 10 which ejects a black ink, in an order from an upstream side in a sheet feed direction shown in the thick arrow in FIG. 2), a frame 3 which supports the two heads 10 and an upper one of a pair of feed rollers 24, the two cartridges 35 which are respectively mounted in two cartridge mount portions 80 (as an example of a tank mount portion), and a controller 1p (shown in FIG. 2) which controls operations of respective portions of the printer 1. In the present embodiment, the two heads 10 and the frame 3 constitute the recording portion 9 which records an image on the recording sheet P. The two heads 10 are held by the upper housing 1a through the frame 3.

In the upper housing 1a, there are also accommodated upper rollers 25, 26 of two pairs of feed rollers 25, 26, an upper guide 29 of two guides 29 that are disposed between the feed rollers 25, 26, two pairs of feed rollers 27, 28, and two pairs of guides 29 that are disposed between the two pairs of feed rollers 26, 28 in the sheet feed direction. In other words, when the upper housing 1a is pivoted from the close position to the distant position, the above-described accommodated components are all moved with the upper housing 1a. In FIG. 2, an illustration of some components that are accommodated in the upper housing 1a is omitted.

The lower housing 1b accommodates or retains the supporting portion 60 and the sheet-feed unit 1c. The lower housing 1b also accommodates a sheet sensor 32, two pairs of feed rollers 22, 23, and two pairs of guides 29 that are disposed between the sheet-feed unit 1c and the pair of feed rollers 23 in the sheet feed direction.

Each cartridge 35 (as an example of a tank) stores the pretreatment liquid or the black ink as a recording agent that is supplied to a corresponding head 10. Hereinafter, the pretreatment liquid and the black ink are generally referred to as a liquid. The pretreatment liquid is a liquid for preventing an ink bleeding (leaking) and exuding, for improving a chromogenic effect and a fast-dry effect, and so forth.

Figure 3A:
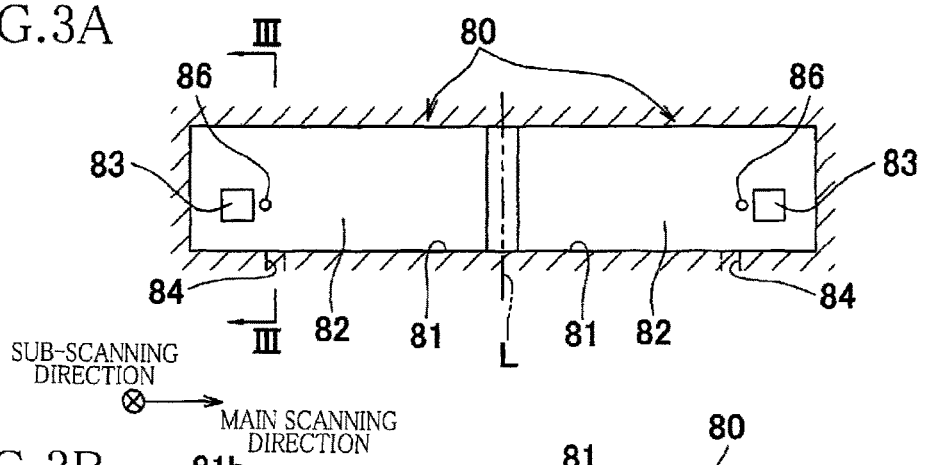
FIGS. 3A through 3C are illustrative views showing a structure of a cartridge mount portion and a resistance applying mechanism.

The cartridge 35 has a rectangular parallelepiped configuration. As shown in FIG. 3C, in a front surface 35a of the cartridge 35 as a surface of the cartridge 35 on a downstream portion in a mounting direction of the cartridge 35 relative to the cartridge mount portion 80, there are disposed a liquid supply portion 36 and a contact 37. The liquid supply portion 36 and the contact 37 are arranged side by side in the main scanning direction. The liquid supply portion 36 consists of an elastic member such as rubber that seals an opening formed in the front surface 35a of the cartridge 35. When the cartridge 35 is mounted in the cartridge mount portion 80, a hollow needle 86 (described later) penetrates through the liquid supply portion 36, i.e., the elastic member, and the cartridge 35 is connected to the corresponding head 10 through a tube (not shown) and a pump (not shown) that are connected to the hollow needle 86. Thus, the liquid stored in the cartridge 35 is supplied to the head 10. In addition, each pump is driven by the controller 1p only in a case where the liquid is forcibly supplied to the corresponding head, i.e., in a case where a purging operation is performed or an initial induction of the liquid is performed. Because a negative pressure occurs in a channel in the head 10 during an image recording, the liquid in the cartridge 35 is automatically supplied to the head 10. In the present embodiment, the contact 37 of the cartridge 35 is a contact of IC chip type in which liquid data, e.g., a sort and an amount of the liquid, and so on are stored. The contact 37 may be a contact which supplies electricity to a sensor or the like that is disposed in the cartridge 35.

Each head 10 is a line-type head extending in the main scanning direction and having a generally rectangular parallelepiped configuration. Two heads 10 are distanced from each other in a sub-scanning direction and supported by the frame 3. Each head 10 is supported by the frame 3 so as to be opposed to the supporting portion 60 at an interval suitable for the recording in the state in which the upper housing 1a is at the close position. In an upper surface of each head 10, there is disposed a joint to which the tube connected to the hollow needle 86 is attached. A lower surface of each head 10 is an ejection surface 10a in which a plurality of nozzles or ejection openings are formed. Further, there is formed a channel in each head 10 through which the liquid supplied from the cartridge 35 is sent to the nozzles.

The sheet-supply unit 1c includes a sheet-supply tray 20 and the sheet-supply roller 21. The sheet-supply tray 20 is detachably attached to the lower housing 1b in the sub-scanning direction. The sheet-supply tray 20 is a box-like member opening upward and can accommodate the recording sheets P with a plurality of sizes. The sheet-supply roller 21 is rotated by controlling of the controller 1p so as to supply an uppermost one of the recording sheets P stored in the sheet-supply tray 20. The recording sheet P supplied by the sheet-supply roller 21 is fed to the supporting portion 60, guided by the guides 29 and nipped by the feed rollers 22, 23, in order.

The supporting portion 60 is located to be opposed to the recording portion 9 in a vertical direction. The supporting portion 60 includes two platens 61 which are respectively opposed to the corresponding heads 10, and a frame 11 which supports the platens 61. The frame 11 rotatably supports a lower one of the pair of the feed rollers 24.

Each platen 61 has a size that is slightly larger than that of the ejection surface 10a of each head 10 in the main scanning direction and in the sub-scanning direction and is opposed to the ejection surface 10a in the vertical direction.

An upper surface of the platen 61 is the supporting surface 61a which is opposed to the ejection surface 10a and supports the recording sheet P. A material and working (processing) are devised so as to be suitable for supporting of the recording sheet P. For example, such a way that a lightly-adhesive silicon layer is formed on the supporting surface 61a or that a multiplicity of ribs in the sub-scanning direction are formed on the supporting surface 61a prevents the recording sheet P placed on the supporting surface 61a from rising from the supporting surface 61a. The platen 61 is formed of a resin.

In the present embodiment, when the controller 1p receives a command for the recording from an external device, based on the recording command, the controller 1p drives a sheet-supply motor (not shown) for the sheet-supply roller 21, feed motors (not shown) for the respective pairs of feed rollers 22 through 28, and so on. The recording sheet P supplied from the sheet-supply tray 20 is fed to the supporting portion 60 through the guides 29. The recording sheet P sent to the supporting portion 60 is conveyed, supported by the supporting surface 61a and nipped by the pairs of feed rollers 23, 24, 25 that are rotated. When the recording sheet P passes right below the two heads 10 in order, each head 10 is driven by the control of the controller 1p to eject the liquid through the nozzles of each ejection surface 10a toward a surface of the recording sheet P, so that an image is formed on the recording sheet P. An ink ejection from the nozzles of each head 10 is performed based on a detection signal from the sheet sensor 32 under the control of the controller 1p. The recording sheet P is then fed upward, guided by the guides 29 and nipped by the pairs of feed rollers 26, 27, 28, and discharged to the sheet-discharge portion 31 through an opening 30 that is formed in an upper portion of the upper housing 1a.

During the recording operation, the controller 1p can detect whether a jamming (a jamming of the recording sheet P in the sheet feed path) occurs. More precisely, the jamming is detected by the controller 1p, based on signals from the sheet sensor 32 and/or respective drive motors of the pair of feed motors 22 through 28. In a case where the jamming occurs during the recording operation, the controller 1p controls the heads 10 and the respective motors such that the recording operation is stopped (suspended). Then, in order to perform the jam treatment, i.e., a work in which the jamming of the recording sheet P in the sheet feed path is cleared, the user opens the cover 1d and, after the limitation by the lock mechanism 70 is released, pivots the upper housing 1a from the close position to the distant position. After the jammed recording sheet P is removed by the user in the workspace formed between the upper and the lower housings 1a, 1b, the upper housing 1a is returned to the close position. Then, the pivot of the upper housing 1a is limited by the lock mechanism 70 and the cover 1d is closed. The jam treatment is thus finished. After the jam treatment is finished, the recording operation starts when the controller 1p again receives the recording command from the external device.

Hereinafter, the cartridge mount portion 80 will be described with reference to FIGS. 1 through 3.

As shown in FIG. 1 and FIG. 2, the two cartridge mount portions 80 are disposed in the upper portion of the upper housing 1a. As shown in FIG. 1 and FIG. 3A, the two cartridge mount portions 80 are arranged side by side in the main scanning direction. As shown in FIG. 3A, the two cartridge mount portions 80 are formed symmetrically with respect to a line L (indicated by a two-dot chain line in FIG. 3A) which passes on just a middle of the two cartridge mount portions 80 in the main scanning direction and extends in the vertical direction. In the present embodiment, because the two cartridge mount portions 80 have the same structure, one of the two cartridge portions 80 will be described as follows.

Figure 3B:
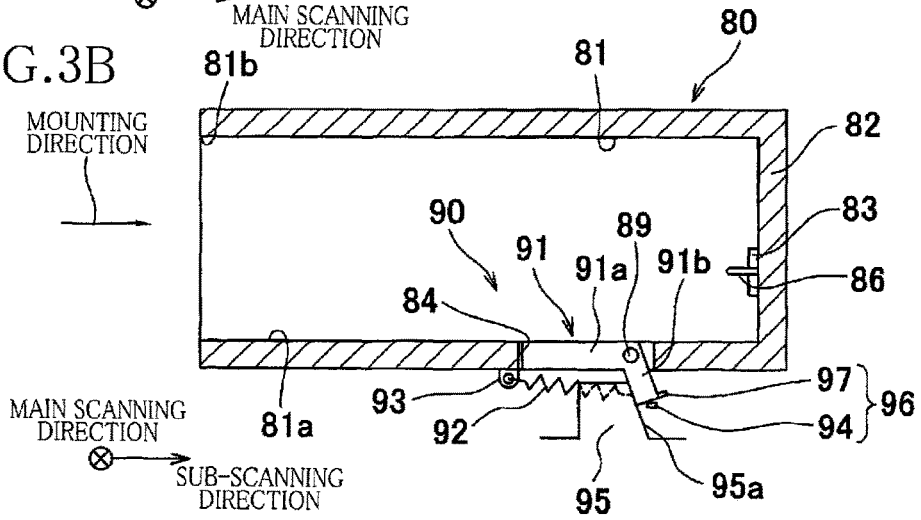
Figure 3C:
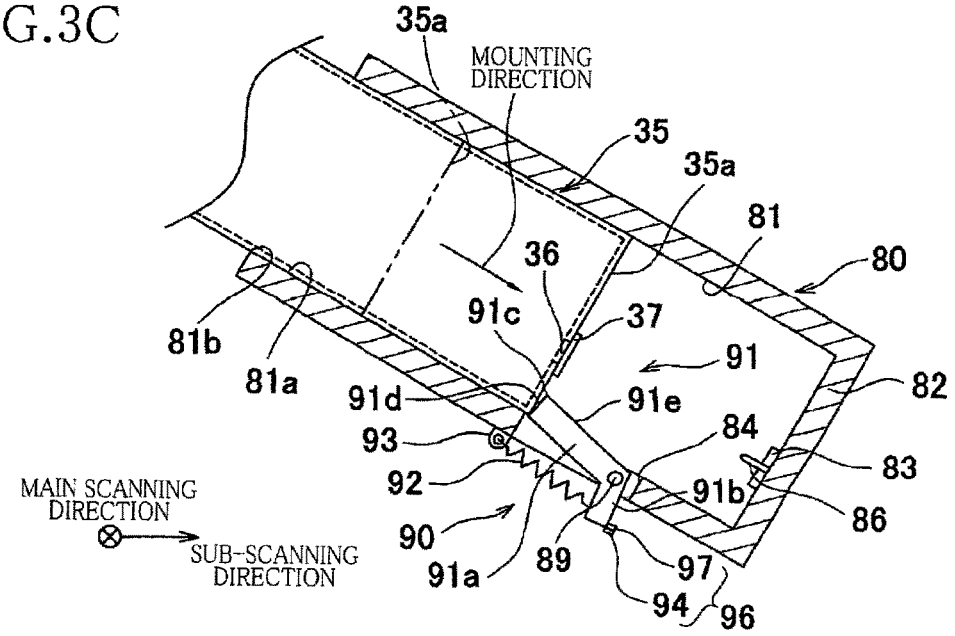

As shown in FIGS. 3A through 3C, the cartridge mount portion 80 has a recessed portion 81 to which the cartridge 35 having a generally rectangular parallelepiped shape is attachable. An opening 81b of the recessed portion 81 is an insertion opening in which the cartridge 35 is inserted and is formed in the front surface of the upper housing 1a. The recessed portion 81 extends from the opening 81b toward the downstream portion in the mounting direction of the cartridge 35 in the cartridge mount portion 80. Accordingly, the mounting direction of the cartridge 35 in the cartridge mount portion 80 is a horizontal direction in the state in which the upper housing 1a is at the close position, as shown in FIG. 3B, and is a direction having a downward component in the vertical direction in the state in which the upper housing 1a is at the distant position, as shown in FIG. 3C. There are disposed a contact 83 and the hollow needle 86 in a bottom portion 82 as a downstream surface of the recessed portion 81 in the mounting direction of the cartridge 35 in the cartridge mount portion 80. The contact 83 and the hollow needle 86 are arranged side by side in the main scanning direction. When the cartridge 35 is thoroughly mounted in the recessed portion 81, the contact 83 is electrically connected to the contact 37 (shown in FIG. 3C). In the present embodiment, a state in which the cartridge 35 is thoroughly mounted in the recessed portion 81 is a state in which the cartridge 35 is positioned at a position where the cartridge 35 is arranged when the hollow needle 86 penetrates through the liquid supply portion 36. The contact 83 in the present embodiment consists of an IC board. As a modified embodiment, the contact 83 may be a contact which is electrically connected to a contact which supplies electric power to a sensor and so on that are disposed in the cartridge 35. The hollow needle 86 protrudes from the bottom portion 82 along the mounting direction of the cartridge 35. The hollow needle 86 is connected to the tube (not shown) that is connected to the head 10. When the hollow needle 86 penetrates through the liquid supply portion 36, the cartridge 35 is connected to the corresponding head 10 that is opposed to the cartridge 35.

As shown in FIG. 3, there is formed a penetrating portion 84 at a position adjacent to the contact 83 and the hollow needle 86. The penetrating portion 84 is disposed at a lower inner surface 81a of the recessed portion 81. There is disposed a resistance applying mechanism 90 in the penetrating portion 84 of the cartridge mount portion 80. The resistance applying mechanism 90 includes a pivot member 91 (as an example of a moving body), an engaging portion 95 and a spring 92. The penetrating portion 84 is located at a position that is aligned with the hollow needle 86 in the mounting direction of the cartridge 35 in the cartridge mount portion 80. In other words, the resistance applying mechanism 90 is located at the position that is aligned with the hollow needle 86 in the mounting direction of the cartridge 35 in the cartridge mount portion 80.

As a modified embodiment, the penetrating portion 84 may be disposed at a left, a right or an upper inner surface of the recessed portion 81 other than the lower inner surface 81a of the recessed portion 81, and the resistance applying mechanism 90 may be disposed therein.

The pivot member 91 is pivotably supported by a shaft 89 which is disposed in the penetrating portion 84 and extends in the main scanning direction. The penetrating portion 84 is located on an upstream portion of the contact 82 and an end of the hollow needle 86 in the inner surface 81a in the mounting direction. In other words, the pivot member 91 is located so as to apply the resistance to the cartridge 35 on the upstream portion of the contact 83 and the end of the hollow needle 86 in the mounting direction. As shown in FIG. 3B, the pivot member 91 includes a horizontal portion 91a which extends horizontally in the sub-scanning direction in the state in which the upper housing 1a is at the close position and an inclining portion 91b which extends obliquely downward from one of opposite ends of the horizontal portion 91a, and has a L-shaped configuration. An upper surface of the horizontal portion 91a constitutes a part of the lower inner surface 81a of the recessed portion 81 in the state in which the upper housing 1a is at the close position.

One of opposite ends of the coil spring 92 (as an example of a force applying portion) is fixed to a lower end portion of the inclining portion 91b, i.e., one of opposite end portions thereof that is farther away from the shaft 89. The other end of the spring 92 is fixed to a flange 93 that is formed in a lower surface of the cartridge mount portion 80. Accordingly, the pivot member 91 is applied a force by the spring 92 in a clockwise direction in FIG. 3B. In the present embodiment, the coil spring 92 is adopted as the force applying portion, but any elastic member can be adopted as long as the elastic member can apply a force to the pivot member 91 in the clockwise direction in FIG. 3B. The spring 92 is also supported by the upper housing 1a.

In the lower end portion of the inclining portion 91b, there is formed a projecting portion 97. In the upper housing 1a, a stopper 94 is formed in the vicinity of the inclining portion 91b. The projecting portion 97 and the stopper 94 constitute a limiting portion 96 which limits a range of pivot of the pivot member 91. When the upper housing 1a is pivoted to the distant position, even though the pivot member 91 is pivoted by the force of the spring 92, the projecting portion 97 contacts the stopper 94 in such a way against the force of the spring 92. The contact between the projecting portion 97 and the stopper 94 limits the pivot range of the pivot member 91 such that the horizontal portion 91a stays (maintains) at a projecting position (described later). Thus, the pivot member 91 is prevented from pivoting too much by the spring 92 and is positioned at the projecting position, so that, in the cartridge mount portion 80, the cartridge 35 can be certainly stopped from moving in the mounting direction in the state in which the upper housing 1a is at the distant position.

As shown in FIG. 1, the two engaging portions 95 are respectively formed on respective upper ends of two frames 1e that are components of the lower housing 1b. As shown in FIG. 3B, each engaging portion 95 is formed so as to be opposed to the corresponding penetrating portion 84 in the state in which the upper housing 1a is at the close position. The engaging portion 95 also includes an inclined surface 95a which is engageable with the inclined portion 91b in the state in which the upper housing 1a is at the close position. Further, since the engaging portion 95 is engaged with the inclined portion 91b when the upper housing 1a is pivoted from the distant position to the close position, the pivot member 91 is pivoted in a counterclockwise direction in FIG. 3B.

Hereinafter, the movement of the resistance applying mechanism 90 will be described. The resistance applying mechanism 90 operates simultaneously with the pivot of the upper housing 1a. In other words, in the state in which the upper housing 1a is at the close position, the pivot member 91 of the resistance applying mechanism 90 is applied the force by the spring 92, but the pivot of the pivot member 91 is limited because the inclining portion 91b and the engaging portion 95 are engaged with each other. Therefore, the pivot member 91 is positioned at a retracted position in which the other end of the horizontal portion 91a does not project to the recessed portion 81, i.e., does not project from the lower inner surface 81a.

As shown in FIG. 3C, while the upper housing 1a is pivoted from the close position to the distant position, the pivot member 91 supported by the upper housing 1a is distanced away from the engaging portion 95 and the engagement between the engaging portion 95 and the inclining portion 91b is released. Accordingly, the pivot member 91 is pivoted by the force of the spring 92 and the horizontal portion 91a of the pivot member 91 is positioned at the projecting position where the horizontal portion 91a projects from the lower inner surface 81a. At this time, the projecting portion 97 contacts the stopper 94, so that the horizontal portion 91a is positioned at the projecting position with certainty. Further, in the state in which the pivot member 91 is at the projecting position, an inclined surface 91d which is inclined from a top end portion 91c of the horizontal portion 91a toward the upstream portion thereof in the mounting direction is greater in angle with respect to the lower inner surface 81a than an inclined surface 91e which is inclined from the top end portion 91c of the horizontal portion 91a toward a downstream portion thereof in the mounting direction. Thus, in the state in which the upper housing 1a is at the distant position, the movement of the cartridge 35 in the mounting direction can be stopped more certainly. In addition, when the cartridge 35 is removed from the cartridge mount portion 80, a surface of the cartridge 35 which is opposed to the inner surface 81a is hardly caught (hooked) on the inclined surface 91e, so that the resistance force occurring when the cartridge 35 is removed is reduced.

When the upper housing 1a is pivoted from the distant position to the close position, a bottom end of the inclining portion 91b first contacts the inclined surface 95a of the engaging portion 95. Then, as the upper housing 1a approaches the close position, the inclining portion 91b is pressed by the inclined surface 95a. When the upper housing 1a reaches the close position, the pivot member 91 is positioned at the retracted position due to the engagement with the engaging portion 95. The engaging portion 95 is engaged with the inclining portion 91b against the force of the spring 92 such that the pivot member 91 moves from the projecting position to the retracted position. Thus, the pivot member 91 can be selectively positioned at the projecting position or at the retracted position corresponding to the pivot of the upper housing 1a.

As mentioned above, in the present embodiment, only when the upper housing 1a is at the close position, the pivot member 91 is positioned at the retracted position. At this time, even when the cartridge 35 is mounted in the cartridge mount portion 80, the cartridge 35 can be mounted in the cartridge mount portion 80 without being caught on the pivot member 91. Further, in the state in which the upper housing 1a is at the close position, the mounting direction of the cartridge 35 in the cartridge mount portion 80 is in parallel with the horizontal direction or the sub-scanning direction. Thus, the cartridge 35 can be mounted in the cartridge mount portion 80 with a given mounting force by the user. Accordingly, without a high-impact between the contacts 37, 83 and between the liquid supply portion 36 and the hollow needle 86, and without a damage of the cartridge 35 and the cartridge mount portion 80, the cartridge 35 can be mounted in the cartridge mount portion 80.

When the upper housing 1a is pivoted from the close position to the distant position in a state in which a front end of the cartridge 35 in the mounting direction or a downstream end of the cartridge 35 in the mounting direction is inserted into the recessed portion 81 of the cartridge mount portion 80, the cartridge 35 operates simultaneously with the pivot of the upper housing 1a and is moved obliquely downward, i.e., in the direction including the downward component in the vertical direction relative to the cartridge mount portion 80. Further, when the cartridge 35 is inserted into the recessed portion 81 of the cartridge mount portion 80 in a state in which the upper housing 1a is at the distant position, as shown in FIG. 3C, the mounting direction of the cartridge 35 relative to the cartridge mount portion 80 extends obliquely downward, i.e., in the direction including the downward component in the vertical direction.

At this time, in the state in which the upper housing 1a is at the distant position, the pivot member 91 is positioned at the projecting position. Therefore, even when the cartridge 35 quickly and actively moves from a position indicated by a two-dot chain line in FIG. 3C in the mounting direction, the movement of the cartridge 35 is stopped by the pivot member 91. In other words, before the cartridge 35 is thoroughly mounted in the cartridge mount portion 80, an end of the pivot member 91 at the projecting position and the cartridge 35 are in contact with each other, and the resistance for stopping of the movement of the cartridge 35 is applied by the pivot member 91. The resistance force is a force different from the kinetic friction force that occurs due to the contact between the cartridge 35 and the left and the right inner surfaces and the upper and the lower inner surfaces of the recessed portion 81 and a force which acts in an opposite direction to the mounting direction. An impact power due to the contact with the cartridge 35 and the pivot member 91 is smaller than an impact power due to the contact with the cartridge 35 and the cartridge mount portion 80 when the cartridge 35 is moved to a position in which the cartridge 35 is completely mounted in the cartridge mount portion 80. Thus, the cartridge 35 and the pivot member 91 are free of damage by the contact with them. Since the movement of the cartridge 35 is stopped by the pivot member 91, without having a high-impact on the contacts 37, 83 and the liquid supply portion 36 and the hollow needle 86, the cartridge 35 and the cartridge mount portion 80 are prevented from being damaged.

As described above, in the printer 1 in the present embodiment, even in a case where the upper housing 1a is pivoted from the close position to the distant position in a state in which the cartridge 35 is in the process of being mounted in the cartridge mount portion 80, or even in a case where the cartridge 35 is mounted in the cartridge mount portion 80 in a state in which the upper housing 1a is at the distant position, the resistance is applied to the cartridge 35 by the pivot member 91, in addition to the kinetic friction force between the cartridge 35 and the inner surface 81a. Thus, the impact between the cartridge mount portion 80 and the cartridge 35 can be restrained. Accordingly, the cartridge mount portion 80 and the cartridge 35 are less subject to the damage.

By the pivot of the upper housing 1a from the close position to the distant position, as mentioned before, the user obtains the workspace. When the upper housing 1a is at the distant position and the workspace for the user is secured, the user can perform the jam treatment and the maintenance works in the recording portion 9 and the supporting portion 60. In other words, the upper housing 1a is pivoted from the close position to the distant position in order that the user performs the jam treatment and the maintenance works in the recording portion 9 and the supporting portion 60, and the upper housing 1a is not pivoted in order that the cartridge 35 is inserted into or extracted from the upper housing 1a. The upper housing 1a is pivoted for the purpose different from the insertion and extraction of the cartridge 35. Therefore, there can be a case where the upper housing 1a is pivoted from the close position to the distant position in a state in which the cartridge 35 is in the process of the mounting in the cartridge mount portion 80, or a case where the cartridge 35 is mounted in the cartridge mount portion 80 in a state in which the upper housing 1a is at the distant position. In the present embodiment, the impact between the cartridge mount portion 80 and the cartridge 35 can be restrained, so that the cartridge mount portion 80 and the cartridge 35 are restrained from being damaged.

The pivot member 91 is located on the upstream portion of the contact 83 and the end of the hollow needle 86 in the inner surface 81a in the mounting direction. In other words, the resistance can be applied to the cartridge 35 on the upstream portion of the contact 83 and the end of the hollow needle 86 in the mounting direction. Accordingly, the contact 83 and the hollow needle 86 can be restrained from being damaged.

In the present embodiment, the contact 83 and the contact 37 of the cartridge 35 are electrically connected to each other. In a case where the contacts 83, 37 that are electrically connected are deformed, there is the possibility that the contacts 83, 37 cannot be electrically connected to each other. However, since the impact between the cartridge 35 and the cartridge mount portion 80 is reduced due to the resistance applying mechanism 90, the contacts 37, 83 are restrained from being deformed, so that the damage of the cartridge 35 and the cartridge mount portion 80 can be restrained.

Further, if the pivot member is located at a position more distanced from the contact 83 and the hollow needle 86 than a center of the recessed portion 81 in the main scanning direction, when the cartridge 35 is mounted in the recessed portion 81 in the state in which the upper housing 1a is at the distant position, there is the possibility that the cartridge 35 is rotated about a contact point of the cartridge 35 and the pivot member as a center of the rotation and the cartridge 35 contacts the contact 83 and the hollow needle 86. In the present invention, however, the pivot member 91 is located to be adjacent to the contact 83 and the hollow needle 86 in the main scanning direction. Therefore, the damage of the contact 83 and the hollow needle 86 can be more certainly restrained.

Because the resistance applying mechanism 90 includes the pivot member 91 which is pivotable between the retracted position and the projecting position, the cartridge 35 can be stopped from moving in the mounting direction. Further, the pivot member 91 is at the retracted position when the upper housing 1a is at the close position, so that, when the upper housing 1a is at the close position, the cartridge 35 can be easily mounted in the cartridge mount portion 80.

Because the resistance applying mechanism 90 also includes the spring 92 which applies the force to the pivot member 91 and the engaging portion 95 which is engaged with the pivot member 91, simultaneously with the pivot of the upper housing 1a, the pivot member 91 can be surely moved between the projecting position and the retracted position.

Since the upper housing 1a supports the recording portion 9 and the lower housing 1b supports the supporting portion 60, when the upper housing 1a is pivoted from the close position to the distant position, the user can perform the maintenance work in which the jammed recording sheet P is removed between the recording portion 9 and the supporting portion 60, the maintenance work in the recording portion 9, and the maintenance work in the supporting portion 60.

Figure 4A:
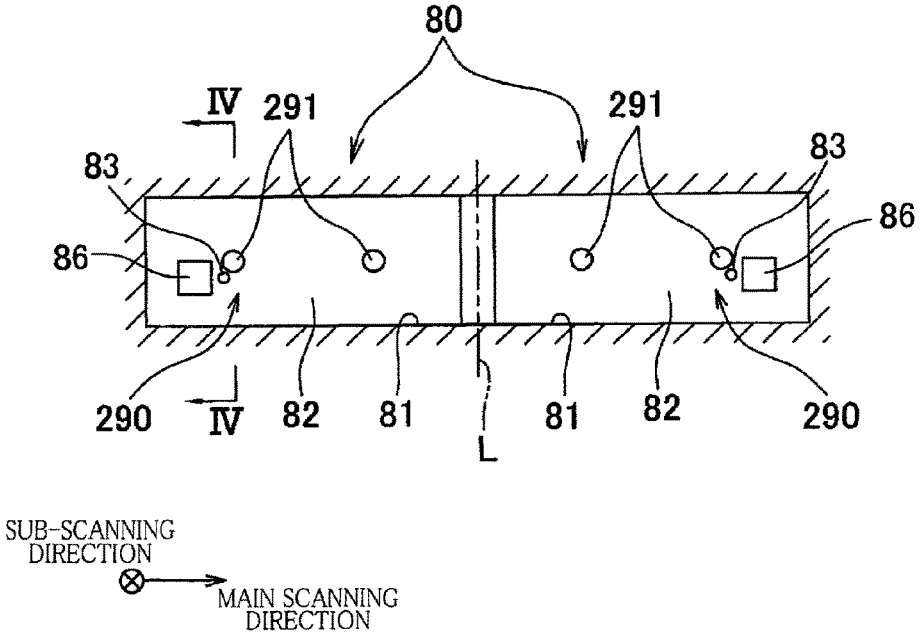
FIG. 4A and FIG. 4B are illustrative views showing a modified embodiment of a resistance applying mechanism of the inkjet printer as the embodiment of the present invention.
Figure 4B:
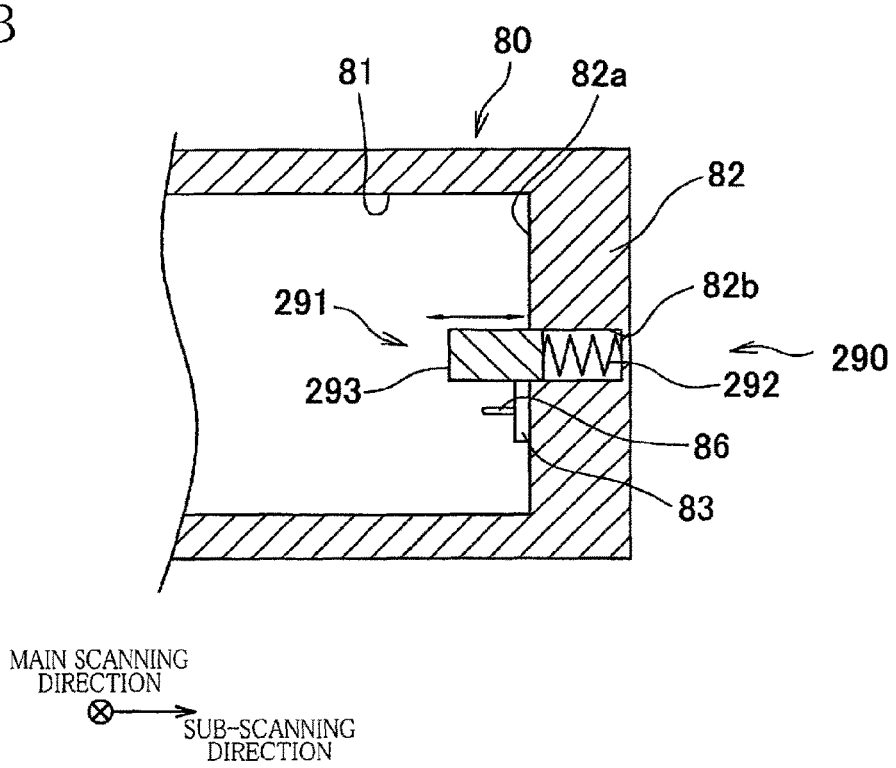

As a modified embodiment, a resistance applying mechanism 290 as shown in FIGS. 4A and 4B may be adopted. As shown in FIG. 4A, each of the two resistance applying mechanisms 290 in the modified embodiment is disposed in the bottom portion 82 of the recessed portion 81 of each cartridge mount portion 80. Each resistance applying mechanism 290 includes two elastic bodies 291 that are arranged side by side in the main scanning direction.

The elastic body 291 includes a spring 292 which is located in a circular hole 82b that is formed in the bottom portion 82, and a cylindrical portion 293 which is fixed to the spring 292. A diameter of the cylindrical portion 293 is slightly smaller than that of the hole 82b. The cylindrical portion 293 is applied a force by the spring 292 such that, when no cartridge 35 is mounted in the cartridge mount portion 80, the cylindrical portion 293 is positioned at a projecting position, a position shown in FIG. 4B, at which a part of the cylindrical portion 293 is projected from the hole 82b. In a state in which the cylindrical portion 293 is at the projecting position, an end of the cylindrical portion 293 is located on an upstream portion of the end of the hollow needle 86 in the mounting direction.

In this structure, in the state in which the upper housing 1a is at the distant position, when the cartridge 35 is quickly and actively moved in the recessed portion 81 of the cartridge mount portion 80 in the mounting direction, the front surface 35a of the cartridge 35 contacts an end of the elastic body 291. At the time, the impact of the cartridge 35 in the mounting direction is absorbed by the spring 292. In other words, by the elastic body 291, the impact force is reduced and the resistance that stops the movement of the cartridge 35 is applied. As a result, it is prevented that a high impact is applied to the contacts 37, 83 and the liquid supply portion 36 and the hollow needle 86, so that the damage of the cartridge 35 and the cartridge mount portion 80 can be prevented. Then, the user pushes the cartridge 35 into the cartridge mount portion 80 with a force larger than the force by the spring 292 such that the cartridge 35 can be mounted in the cartridge mount portion 80. In the modified embodiment, in a state in which the upper housing 1a is at either one of the distant position or the close position, the impact between the cartridge mount portion 80 and cartridge 35 can be restrained and the cartridge 35 can be mounted in the cartridge mount portion 80. Further, in the modified embodiment, the two elastic bodies 291 constitute the resistance applying mechanism 290, so that a structure of the resistance applying mechanism 290 is simplified. The resistance applying mechanism 290 in the modified embodiment may consist of one elastic body 291. In this case, it is desirable that the elastic body 291 is located in a position adjacent to the contact 83 and the hollow needle 86.

The preferred embodiments of the present invention were described above, however, the present invention is not limited to the illustrated embodiments. It is to be understood that the present invention may be embodied with various changes and modifications that may occur to a person skilled in the art, without departing from the spirit and scope of the invention defined in the appended claims. For example, the printer 1 in the above-mentioned embodiments includes the cartridges 35, but the recording apparatus to which the present invention is applied may include no cartridges 35. In other word, the recording apparatus may include the cartridge mount portion 80 in which the cartridge 35 can be mounted. Three or more cartridge mount portions 80 may be disposed in the main scanning direction or a plurality of the cartridge mount portions 80 may be aligned with each other in the vertical direction. Further, though the cartridge includes a reservoir portion which stores the pretreatment liquid and the ink as a recording agent that are supplied to the heads 10 in order to record an image on the recording sheet, the cartridge may also include waste liquid reservoir portion which stores a waste liquid that is discharged from the heads 10.

The contact 37 of the cartridge 35 may not be a contact that is electrically connected to the contact 83. The contact 37 is enough to have a structure to contact the contact 83. The contact 83 may not be a contact that is electrically connected to the contact 37 of the cartridge 35. For example, the contact 83 may be a mechanical switch which outputs a detection signal when the contact 83 is pressed due to the contact thereof with the contact 37 of the cartridge 35.

The present invention is applicable to any one of a line-type printer and a serial-type printer. Further, the present invention is, not limited to a printer, applicable to a facsimile machine, a copier machine, and so forth, and also applicable to a recording apparatus which performs a recording operation by ejecting liquid except ink. The present invention is not limited to an inkjet recording apparatus, and is applicable to, for example, a laser-type recording apparatus, a thermal-type recording apparatus and so on. The recording media are not limited to the recording sheets P, and may be various recordable media.

The resistance applying mechanism 90 may be located at a position that is aligned with the contact 83 in the mounting direction of the cartridge 35 in the cartridge mount portion 80. The resistance applying mechanisms 90, 290 may be disposed in the vicinity of the opening 81b of the cartridge mount portion 80. In other words, the resistance applying mechanisms 90, 290 may be located far distanced from the contact 83 and so on. The resistance applying mechanism 90 may have no limiting portion 96. Further, in the state in which the pivot member 91 is at the projecting position, the angle of the inclined surface 91d of the horizontal portion 91a with respect to the lower inner surface 81a may be smaller than that of the inclined surface 91e or may be the same as that of the inclined surface 91e. The elastic body 291 may be formed of an elastic material such as rubber.

What is claimed is:

1. A recording apparatus comprising:

a supporting portion configured to support a recording medium;

[a first housing configured to support the supporting portion;]

a recording portion configured to record an image on the recording medium supported by the supporting portion, the recording portion configured to record the image using a recording agent;

[a second housing configured to connect with the first housing via a shaft and configured to support the recording portion, the second housing being further configured to be pivotable about the shaft, relative to the first housing, between a close position at which the image is recorded on the recording medium by the recording portion and a distant position at which the second housing is distant farther from the first housing than at the close position; and]

a tank mount portion [supported by the second housing such that], a mounting direction of a tank with respect to the tank mount portion [in a state in which the second housing is at the distant position has] *having* a downward component in a vertical direction, [the tank mount portion being configured to pivot together with the second housing, and] the tank *being* configured to store the recording agent, *the mounting direction of the tank in the tank mount portion being a horizontal direction in a state in which the tank mount portion is at a first position, and being a direction having the downward component in the vertical direction in a state in which the tank mount portion is at a second position at which the tank mount portion is positioned farther from the supporting portion than at the first position,* wherein the tank mount portion comprises a resistance applying mechanism configured to apply a resistance force[, when the second housing is at the distant position,] to the tank in a state in which at least a part of the tank is inserted into the tank mount portion in the mounting direction, the resistance applying mechanism configured to apply the resistance force to the tank in addition to a kinetic friction force that is applied from an inner surface of the tank mount portion to the tank, and the resistance applying mechanism configured to apply the resistance force to act in a direction opposite to the mounting direction, wherein a lower inner surface of the inner surface is configured to face a lower surface of the tank in a state in which the tank is inserted into the tank mount portion, wherein the tank mount portion comprises a contact portion configured to detect contact with the tank, the contact portion being provided on a bottom surface, which is a downstream surface of the tank mount portion in the mounting direction, wherein the resistance applying mechanism is disposed nearer to a center position of the tank mounting portion than the contact portion in a first direction, which is a direction parallel to the lower inner surface and perpendicular to the mounting direction, wherein the resistance applying mechanism comprises a moving body configured to move from a retracted position to a projecting position [in response to movement of the second housing from the close position toward the distant position and configured to move from the projecting position to the retracted position in response to movement of the second housing from the distant position toward the close position] *in response to movement of the tank mount portion from the first position toward the second position and configured to be moved from the projecting position to the retracted position in response to movement of the tank mount portion from the second position to the first position*, and wherein the projecting position is a position at which the moving body applies the resistance force to the tank and the retracted position is a position at which the moving body does not apply the resistance force to the tank.

2. The recording apparatus according to claim 1 wherein the resistance applying mechanism is configured to apply the resistance force to the tank at a position distant from the contact portion in the direction opposite to the mounting direction.

3. The recording apparatus according to claim 2, wherein the resistance applying mechanism is located in a position adjacent to the contact portion.

4. The recording apparatus according to claim 1, wherein the resistance applying mechanism comprises:

a force applying portion, which is configured to apply a force to move the moving body from the retracted position to the projecting position, and an engaging portion, which is configured to be engaged with the moving body, such that the moving body is moved against the force by the force applying portion from the projecting position to the retracted position[while the second housing is pivoted from the distant position to the close position].

5. The recording apparatus according to claim 4, wherein the resistance applying mechanism comprises a limiting portion configured to limit a movement of the moving body such that the moving body is maintained at the projecting position against the force by the force applying portion[in a state in which the second housing is at the distant position].

6. The recording apparatus according to claim 1, wherein the moving body comprises:

one inclined surface inclined from a top portion of the moving body in a direction opposite to the mounting direction; and another inclined surface inclined from the top portion of the moving body in the mounting direction, and wherein an acute angle of the one inclined surface with respect to the inner surface of the tank mount portion is greater than an acute angle of said another inclined surface with respect to the inner surface thereof in a state in which the moving body is at the projecting position.

7. The recording apparatus according to claim 1, wherein the resistance applying mechanism is formed of an elastic material.

[8. The recording apparatus according to claim 1, wherein the mounting direction is a horizontal direction in the state in which the second housing is at the close position.]

9. The recording apparatus according to claim 1, wherein the resistance applying mechanism comprises:

a force applying portion configured to apply a force to move the moving body from the retracted position to the projecting position, and an engaging portion configured to be engaged with the moving body such that the moving body is positioned at the retracted position against the force by the force applying portion[in the state in which the second housing is at the close position].

10. The recording apparatus according to claim 1, wherein the resistance applying mechanism is configured to protrude from the bottom surface of the tank mount portion in the direction opposite to the mounting direction.

11. The recording apparatus according to claim 1, wherein the resistance applying mechanism and the contact portion are disposed at respective positions nearer to an end portion of the tank mount portion than to the center position in the first direction.

12. The recording apparatus according to claim 1, wherein the resistance applying mechanism comprises:

an elastic member configured to generate the resistance force, and a contact member configured to be in contact with the tank, and wherein the elastic member is disposed on a downstream side of the contact member in the mounting direction and at an area overlapping with an area of the contact member in the first direction.

[13. A recording apparatus comprising:

a first housing;

a second housing configured to connect with the first housing via a shaft and to be pivotable about the shaft, relative to the first housing, between a close position at which an image is recorded on a recording medium and a distant position at which the second housing is distant farther from the first housing than at the close position; and a tank mount portion provided in the second housing such that a mounting direction of a tank with respect to the tank mount portion in a state in which the second housing is at the distant position has a downward component in a vertical direction, the tank configured to store a recording agent for recording an image on the recording medium, wherein the tank mount portion comprises a resistance applying mechanism configured to apply a resistance force, when the second housing is at the distant position, to the tank in a state in which at least a part of the tank is inserted into the tank mount portion in the mounting direction, the resistance applying mechanism configured to apply the resistance force to the tank in addition to a kinetic friction force that is applied from an inner surface of the tank mount portion to the tank, and the resistance applying mechanism configured to apply the resistance force to act in a direction opposite to the mounting direction, wherein the resistance applying mechanism comprises a moving body configured to move from a retracted position to a projecting position in response to movement of the second housing from the close position toward the distant position and configured to move from the projecting position to the retracted position in response to movement of the second housing from the distant position toward the close position, wherein the projecting position is a position at which the moving body applies the resistance force to the tank and the retracted position is a position at which the moving body does not apply the resistance force to the tank, and wherein the moving body comprises a contact surface, which is configured to contact with the tank being inserted in the tank mounting portion in a state in which the moving body is in the projecting position, and which is configured to be spaced apart from the tank in a state in which the moving body is in the retracted position.]

[14. The recording apparatus according to claim 13, wherein the resistance applying mechanism comprises:

a force applying portion, which is configured to apply a force to move the moving body from the retracted position to the projecting position, and an engaging portion, which is configured to be engaged with the moving body, such that the moving body is moved against the force by the force applying portion from the projecting position to the retracted position while the second housing is pivoted from the distant position to the close position.]

[15. The recording apparatus according to claim 14, wherein the resistance applying mechanism comprises a limiting portion configured to limit a movement of the moving body such that the moving body is maintained at the projecting position against the force by the force applying portion in a state in which the second housing is at the distant position.]

[16. The recording apparatus according to claim 13, wherein the moving body comprises:

one inclined surface inclined from a top portion of the moving body in a direction opposite to the mounting direction; and another inclined surface inclined from the top portion of the moving body in the mounting direction, and wherein an acute angle of the one inclined surface with respect to the inner surface of the tank mount portion is greater than an acute angle of said another inclined surface with respect to the inner surface thereof in a state in which the moving body is at the projecting position.]

[17. The recording apparatus according to claim 13, wherein the mounting direction is a horizontal direction in the state in which the second housing is at the close position.]

* * * * *